I. N. KEIM.
CUSHION TIRE.
APPLICATION FILED DEC. 18, 1919.

1,346,032.

Patented July 6, 1920.

WITNESSES
Bernard Aebly

INVENTOR
IVAN N. KEIM.
BY Munn & Co
ATTORNEYS

UNITED STATES PATENT OFFICE.

IVAN N. KEIM, OF MOUNT HOLLY, NEW JERSEY.

CUSHION-TIRE.

1,346,032.   Specification of Letters Patent.   Patented July 6, 1920.

Application filed December 18, 1919. Serial No. 345,734.

*To all whom it may concern:*

Be it known that I, IVAN N. KEIM, a citizen of the United States, and a resident of Mount Holly, in the county of Burlington and State of New Jersey, have invented a new and Improved Cushion-Tire, of which the following is a full, clear, and exact description.

The object of the invention is to provide a new and improved cushion tire more especially designed to be used in lieu of the pneumatic or inner tube inflated tires, and arranged to give the desired resiliency.

Another object is to withstand heavy service especially when used on truck wheels.

Another object is to provide a cushion tire which is simple in construction and composed of few parts, which can be readily assembled or disassembled whenever it is desired to do so.

Another object is to securely hold the cushion tire against accidental radial displacement.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
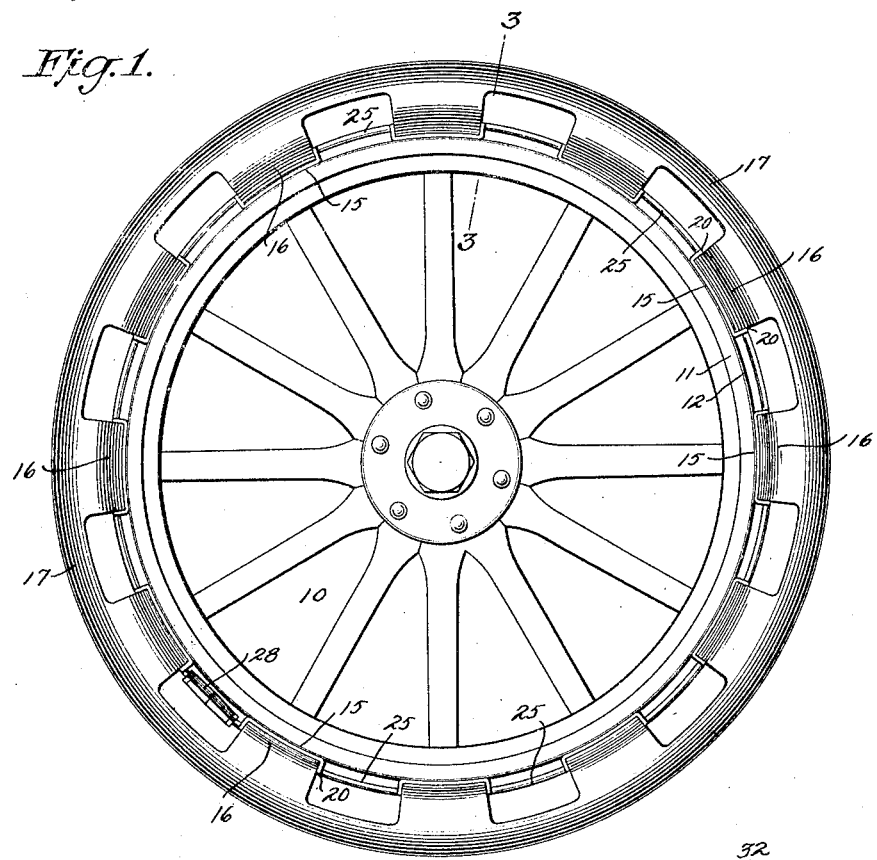
Figure 1 is a face view of a vehicle wheel provided with the improved cushion tire.
Figure 2:
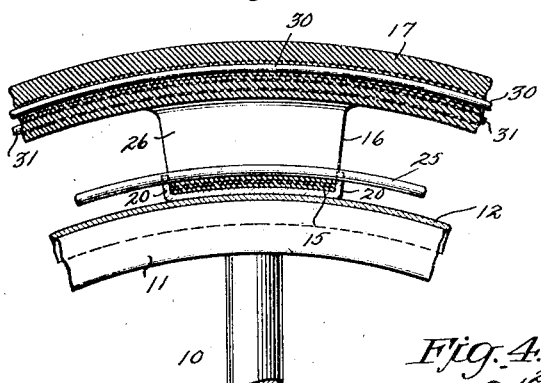
Fig. 2 is an enlarged fragmentary circumferential view of the same.
Figure 3:
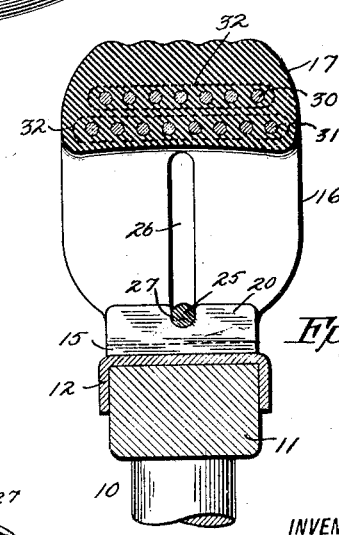
Fig. 3 is an enlarged cross section of the same on the line 3—3 of Fig. 1.
Figure 4:
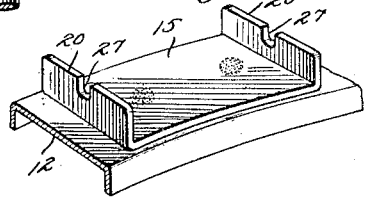
Fig. 4 is a perspective view of one of the seats for the tread blocks and fastened to the felly rim.

The vehicle wheel 10 of usual construction is provided with a felly 11 having a metallic rim 12, on the peripheral face of which are spot-welded or otherwise secured spaced seats 15 on which are seated blocks 16 of resilient material formed integrally with the inner face of a tread 17 made of rubber or other suitable resilient material. It will be noticed that the tread 17 and its spaced blocks 16 provide a single unitary construction.

In order to hold the blocks 16 against creeping, each seat 15 is provided at the ends with upturned lugs 20 fitting against the ends of the block 16 thus holding the latter against circumferential movement on the felly of the wheel. In order to hold the blocks 16 and the tread 17 against radial outward movement, use is made of a ring or hoop 25 extending through openings 26 formed in the blocks 16, the hoop being seated in the bottoms of the seat openings and in cut-out portions 27 formed in the upturned flanges 20 of the seats 15. By the arrangement described, the hoop 25 locks the blocks 16 against radial outward as well as against transverse movement but allows the blocks 16 to yield radially inward when a load is applied. The ends of the hoop 25 are connected with each other by a turnbuckle 28 (see Fig. 1) extending between adjacent seats 15 and serving to draw the hoop tight in the bottoms of the openings 26 and the cut-out portions 27. When it is desired to remove the cushion tire from the wheel, the ends of the hoop 25 are disconnected by correspondingly turning the turnbuckle 28 to allow convenient removal of the tread 17 and its blocks 16 from the wheel.

In order to reinforce the tread 17 use is preferably made of one or more concentric rows of hoops 30, 31 embedded in the rubber and the usual reinforcing textile material 32 embedded in the rubber of the tire 17.

The tire constructed in the manner described provides the desired cushioning effect owing to the spaced resilient blocks 16 extending integrally from the tread 17 and seated on the seats 15. A tire constructed as described is exceedingly serviceable for use on wheels of trucks and other vehicles designed to carry heavy loads.

Having thus described my invention, I claim as new and desire to secure by Letters Patent:

1. A cushion tire for vehicle wheels, comprising a tread of resilient material and provided on its inner face with integral blocks of resilient material, spaced seats on the felly of the wheel and on which the said blocks are seated and held thereby against creeping, and means engaging the said blocks to hold the latter against radial outward movement on the felly.

2. A cushion tire for vehicle wheels, comprising spaced flanged seats on the peripheral face of the felly of the vehicle wheel, a tread provided on its inner face with resilient integral spaced blocks seated on the said seats, and retaining means holding the said blocks in the seats.

3. A cushion tire for vehicle wheels, comprising a tread provided on the inner face with radially disposed spaced blocks, each block having an opening therethrough extending circumferentially, a seat adapted to rest on the felly of the vehicle wheel, and a hoop extending through the said block openings and normally resting on the inner end walls of the said openings.

4. A cushion tire for vehicle wheels, comprising a tread provided on the inner face with radially disposed spaced blocks, each block having an opening therethrough extending circumferentially, seats adapted to rest on the felly of the vehicle wheel, said seats having upturned flanges each provided with a recess, a hoop extending through the said block openings and normally resting on the inner end walls of the said openings and in the recesses of the flanges of the seats, and a turnbuckle connecting the ends of the said hoop with each other.

5. A cushion tire for vehicle wheels, comprising a tread of resilient material provided on its inner face with integral resilient spaced blocks, hoops of spring material circumferentially embedded in the said tread, and seats held in spaced relation on the felly of the wheel and on which the said blocks are seated, each seat being provided at the ends with upturned flanges fitting against the said blocks to hold the tread against creeping.

6. A cushion tire for vehicle wheels, comprising a tread of resilient material provided on its inner face with integral resilient spaced blocks, hoops of spring material circumferentially embedded in the said tread, seats held in spaced relation on the felly of the wheel and on which the said blocks are seated, each seat being provided at the ends with upturned flanges fitting against the said blocks to hold the tread against creeping, and retaining means engaging the said blocks to hold the latter against radial outward movement on the said seats.

I. N. KEIM.